(12) United States Patent
Seltmann et al.

(10) Patent No.: US 12,140,214 B2
(45) Date of Patent: Nov. 12, 2024

(54) COMPOSITE GEARWHEEL FOR AN ELECTROPNEUMATIC HAMMER DRILL

(71) Applicant: Hilti Aktiengesellschaft, Schaan (LI)

(72) Inventors: Daniel Seltmann, Landsberg am Lech (DE); Josef Fuenfer, Koenigsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 289 days.

(21) Appl. No.: 17/613,436

(22) PCT Filed: Jun. 17, 2020

(86) PCT No.: PCT/EP2020/066684
§ 371 (c)(1),
(2) Date: Nov. 22, 2021

(87) PCT Pub. No.: WO2020/260081
PCT Pub. Date: Dec. 30, 2020

(65) Prior Publication Data
US 2022/0213953 A1    Jul. 7, 2022

(30) Foreign Application Priority Data
Jun. 26, 2019  (EP) ................................ 19182585

(51) Int. Cl.
*B25F 5/00* (2006.01)
*F16H 55/06* (2006.01)
(Continued)

(52) U.S. Cl.
CPC ............. *F16H 55/06* (2013.01); *B25F 5/001* (2013.01); *F16H 55/12* (2013.01); *F16H 55/17* (2013.01);
(Continued)

(58) Field of Classification Search
CPC ............................ B23B 2222/84; B25F 5/001
See application file for complete search history.

(56) References Cited

U.S. PATENT DOCUMENTS 2,451,690 A  * 10/1948  Oehler .................... F16H 55/30
                                                474/160
3,874,067 A  *  4/1975  Toyooka ............... B23K 20/129
                                                156/304.6
(Continued)

FOREIGN PATENT DOCUMENTS

DE      102008019041 A1    10/2008
DE      102014104949 A1    10/2015
EP         2444204 A1       4/2012

OTHER PUBLICATIONS

International Search Report of PCT/EP2020/066684, dated Nov. 9, 2020.

*Primary Examiner* — Gloria R Weeks
(74) *Attorney, Agent, or Firm* — Davidson Kappel LLC

(57) ABSTRACT

Composite gearwheel for an electropneumatic hammer drill, wherein the composite gearwheel has a basic body, consisting of a first material, and an encircling toothing, and wherein the encircling toothing is formed, along a first circular arc, by a toothed body of the composite gearwheel, and is formed, along the remaining second circular arc, by the basic body itself, wherein the toothed body consists of a second material that is different than the first material.

18 Claims, 2 Drawing Sheets

(51) Int. Cl.
*F16H 55/12* (2006.01)
*F16H 55/17* (2006.01)

(52) U.S. Cl.
CPC ....... *B23B 2222/84* (2013.01); *B23B 2226/27* (2013.01); *B23B 2226/61* (2013.01); *B23B 2260/07* (2013.01); *B25D 2222/06* (2013.01); *B25D 2222/42* (2013.01); *B25D 2222/54* (2013.01)

(56) References Cited

U.S. PATENT DOCUMENTS

| | | | | |
|---|---|---|---|---|
| 4,043,214 A * | 8/1977 | Westlake | ................ | F16H 55/12 |
| | | | | 74/447 |
| 4,752,281 A * | 6/1988 | Lammers | ........... | B62D 55/0963 |
| | | | | 474/161 |
| 4,964,842 A * | 10/1990 | Howard | ................ | F16H 55/171 |
| | | | | 474/96 |
| 5,026,329 A * | 6/1991 | Diekevers | ............ | B62D 55/135 |
| | | | | 474/162 |
| 5,852,951 A * | 12/1998 | Santi | ....................... | F16H 55/06 |
| | | | | 74/DIG. 10 |
| 6,092,902 A * | 7/2000 | Weber | .................... | G05G 1/105 |
| | | | | 362/23.17 |
| 9,097,332 B2 * | 8/2015 | Li | ........................... | F16H 55/12 |
| 9,222,569 B2 * | 12/2015 | Mittermair | .............. | F16H 55/18 |
| 9,296,157 B1 * | 3/2016 | Handschuh | .............. | F16H 55/06 |
| 9,302,736 B2 * | 4/2016 | Iwai | ......................... | B62M 9/10 |
| 9,581,231 B2 * | 2/2017 | Pfeiffer | .................... | B62M 9/10 |
| 10,113,632 B2 * | 10/2018 | Lo | ............................ | F16H 55/12 |
| 11,686,381 B1 * | 6/2023 | Steinmetz | .............. | B29C 70/84 |
| | | | | 74/434 |
| 2002/0078777 A1* | 6/2002 | Witucki | .................. | B29C 45/1671 |
| | | | | 74/461 |
| 2007/0270260 A1* | 11/2007 | Latham | ................... | F16H 55/30 |
| | | | | 474/152 |
| 2010/0031764 A1 | 2/2010 | Derse | | |
| 2012/0097409 A1 | 4/2012 | Ontl et al. | | |

* cited by examiner

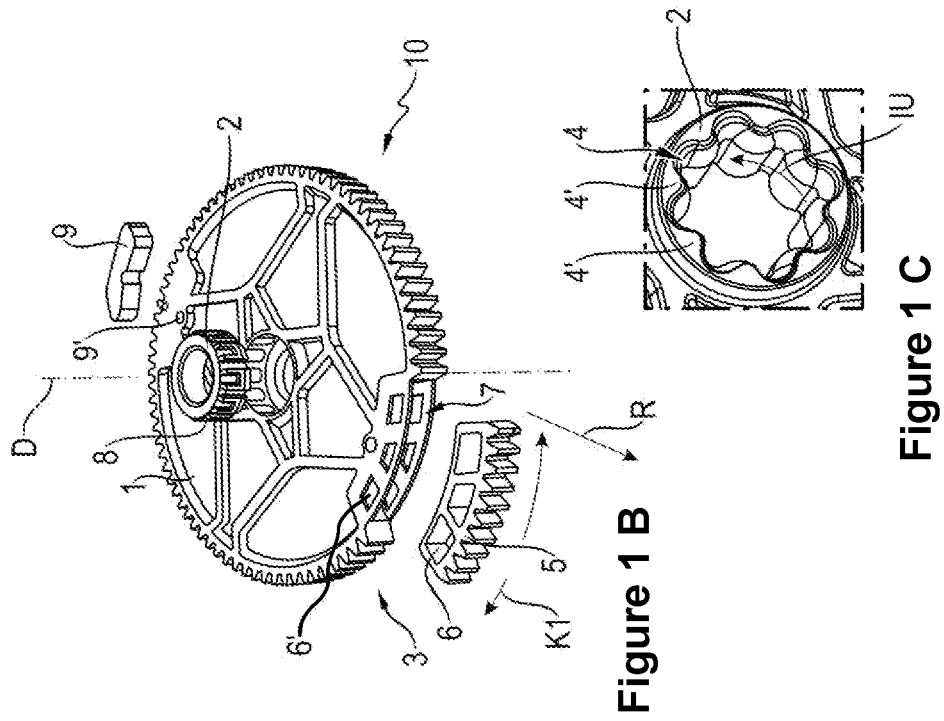
Figure 1 B
Figure 1 C
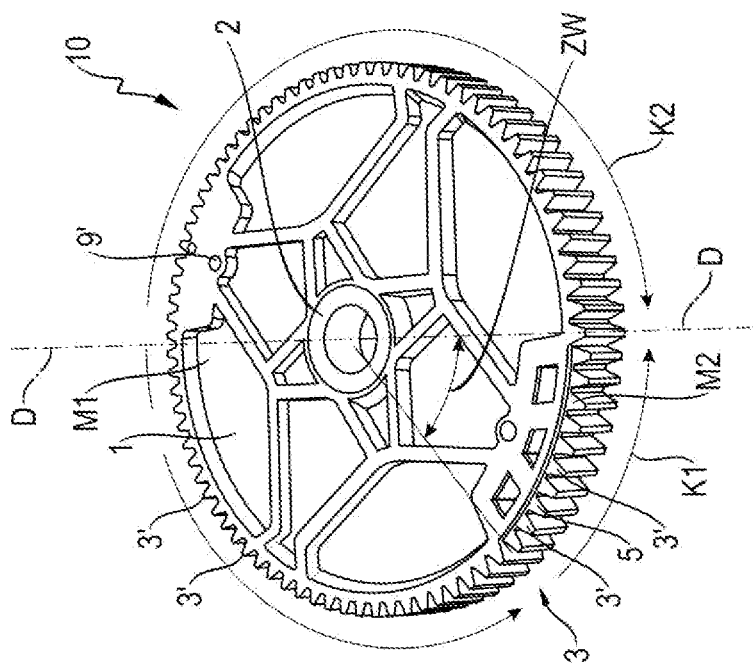
Figure 1 A

COMPOSITE GEARWHEEL FOR AN ELECTROPNEUMATIC HAMMER DRILL

The present invention relates to a composite gearwheel for an electropneumatic hammer drill, wherein the composite gearwheel has a basic body, consisting of a first material, and an encircling toothing.

BACKGROUND

Composite gearwheels of the type mentioned at the beginning are known in principle from the prior art.

SUMMARY OF THE INVENTION

An object of the present invention is to provide a composite gearwheel, in particular for use in a transmission unit of an electropneumatic hammer drill, said gearwheel having comparatively high stability while having a comparatively low weight.

The present invention provides that the encircling toothing is formed, along a first circular arc, by a toothed body of the composite gearwheel, and is formed, along the remaining second circular arc, by the basic body itself, wherein the toothed body consists of a second material that is different than the first material.

The invention incorporates the finding that gearwheels—in particular when they are used in a transmission unit, cooperating with an impact mechanism, of an electropneumatic hammer drill—are exposed to a torque dependent on crank angle. This torque arises periodically and can vary by up to one order of magnitude around a circumference of 360 degrees. Since the encircling toothing of the composite gearwheel according to the invention is formed, along the first circular arc, by a toothed body that consists preferably of steel, a highly loadable but also comparatively heavy reinforcement of the encircling toothing can be restricted to a minimum. As a result, the composite gearwheel according to the invention then has comparatively high stability while having a comparatively low weight. Preferably, the encircling toothing is formed, along a first circular arc, exclusively by the toothed body of the composite gearwheel.

It has been found to be advantageous for the first circular arc to have a center angle of less than 90 degrees, preferably less than 45 degrees.

In a particularly preferred configuration, the basic body has a slot into which the toothed body has been at least partially introduced. In particular, the toothed body is held—both in the circumferential direction and in a radial direction—in a form-fitting manner in the basic body. The toothed body can be held in the basic body in a radial direction by a force fit, for example by being pressed in. Preferably, exactly one toothed body, which has a plurality of teeth of the encircling toothing, is provided.

In a particularly preferred configuration, the composite gearwheel has a balancing weight in order to compensate for an imbalance caused by the toothed body. Preferably, the balancing weight is provided as a separate weight, which is arranged on an opposite side of the composite gearwheel from the toothed body. Alternatively or in addition, the balancing weight can be formed in one piece with the basic body, for example by a material thickening.

It has been found to be advantageous for the first material to be a plastic, for example a thermoplastic or a thermosetting plastic. The second material is preferably metal, in particular a hardened metal. Particularly preferably, the second material is a steel material. Preferably, the composite gearwheel weighs less than 150 grams.

In a further preferred configuration, the composite gearwheel has a central hub, which is provided preferably to define a timing of the composite gearwheel. The central hub may be in the form of an insert and preferably has an internal toothing with eight teeth. The insert can be held in the basic body in a form-fitting, force-fitting or materially bonded manner. The hub in the form of an insert consists preferably of metal, in particular of a hardened metal, preferably steel.

According to the invention, an electropneumatic hammer drill is likewise provided, wherein the composite hammer has a composite gearwheel of the above-described type, wherein the composite gearwheel has been installed in a transmission unit of the hammer drill in such a way that only that part of the encircling toothing that is formed by the toothed body is exposed to an increased torque of an impact mechanism of the hammer drill. The electropneumatic hammer drill can be developed advantageously by the features described with reference to the composite gearwheel.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures:

FIGS. 1 A, 1 B and 1 C show a first preferred exemplary embodiment of a composite gearwheel according to the invention;

FIG. 2 B shows the torque in the transmission unit plotted versus the crank angle KW.

DETAILED DESCRIPTION

Figure 2:
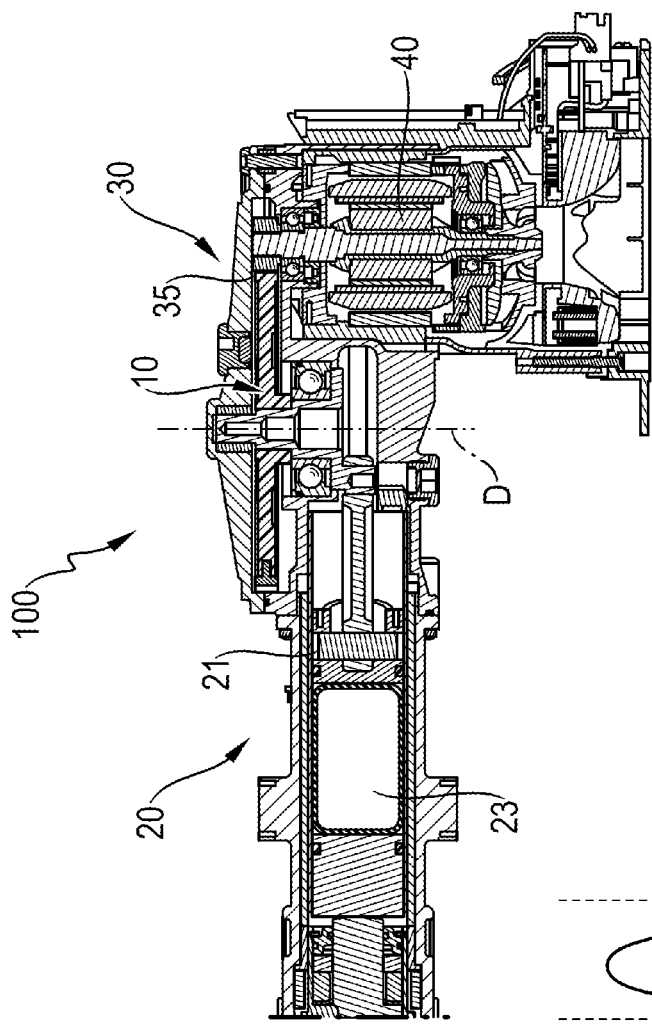
FIG. 2 A shows an electropneumatic hammer drill having the composite gearwheel in FIG. 1.
Figure 2:
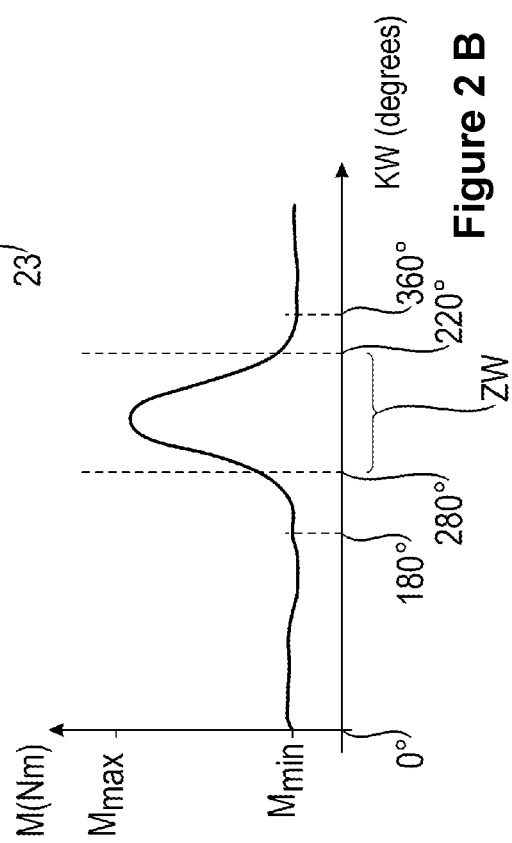

A preferred exemplary embodiment of a composite gearwheel 10 according to the invention is illustrated in FIGS. 1 A, 1 B and 1 C. The composite gearwheel 10 can be used in a transmission unit 30 of an electropneumatic hammer drill 100 (cf. FIG. 2).

The composite gearwheel 10 has a basic body 1 consisting of a first material M1, in the present case for example a thermoplastic, and an encircling toothing 3. The encircling toothing 3 is formed, along a first circular arc K1, only by a toothed body 5 of the composite gearwheel 10. Exactly one toothed body 5 is provided, which has a plurality of teeth 3' of the encircling toothing 3. The second toothed body 5 is formed from a second material M2, which is different than the first material M1. In the presented here, the second material M2 is a steel material.

As can be gathered from FIG. 1 A, the encircling toothing 3 is formed, along the remaining second circular arc K2, by the basic body 1 itself. The first circular arc K1 and the second circular arc K2 are each in relation to an axis of rotation D of the composite gearwheel 10 and add together to form a full circle.

In the exemplary embodiment illustrated in FIG. 1 A, the first circular arc K1 has a center angle ZW of less than 45 degrees, in this case for example about 40 degrees. This corresponds to a sector with comparatively high torque loading (cf. FIG. 2 B).

The composite gearwheel 10 in FIG. 1 A also has a central hub 2 for defining a timing of the composite gearwheel 10.

FIG. 1 B shows the composite gearwheel 10 from FIG. 1 A in an exploded illustration. It is readily apparent that the toothed body 5 is in the form of a separate component, different than the basic body 1. In order to hold the toothed body 5 in the basic body 1, the basic body 1 has a slot 7, into which the toothed body 5 has been at least partially introduced (FIG. 1A shows the toothed body 5 introduced into the slot 7). As can be gathered from FIG. 1 B, the toothed body 5 has a cutout 6. This serves for one part for saving weight. For the other part, the toothed body 5 can be fastened in a radial direction R via this cutout 6 and a corresponding cutout 6', which is formed in the basic body 1. This can take place for example by plugging in a pin, which is not illustrated here, or by joint casting of the cutouts 6, 6'.

As can be gathered from FIG. 1 B, the composite gearwheel 10 has a balancing weight 9, in order to compensate for an imbalance caused by the toothed body 5. The balancing weight 9 is in the form of a separate body, in the present case made of steel, which is located entirely within the basic body 1 with the composite gearwheel 10 assembled (cf. FIG. 1 A). For example, the balancing weight 9 can be held in the basic body 1 in a radial direction R by means of a pin, which is not illustrated here and is intended to be introduced through a pin hole 9' formed in the basic body 1.

As already mentioned, the composite gearwheel 10 has a central hub 2 for defining a timing of the composite gearwheel 10. In the present case, the central hub 2 is in the form of an insert, which is held in the basic body in a form-fitting manner (by means of the external teeth 8).

FIG. 1 C shows, finally, a central hub 2 in detail. The hub 2 has for example an internal toothing 4 with eight teeth 4', which are distributed uniformly along an inner circumference IU of the hub. The teeth 4' are arranged at a spacing of 45 degrees, this corresponding approximately to the center angle ZW of the first circular arc K1 of the toothed body 5. As a result, the gearwheel can be installed in a transmission unit 30 of the hammer drill 100 in such a way that only that part of the encircling toothing 3 that is formed by the toothed body 5 is exposed to an increased torque of an impact mechanism 20 of the hammer drill 100.

FIG. 2 A now shows such an electropneumatic hammer drill 100. The latter has a preferably brushless electric motor 40, which is operatively connected to an impact mechanism 20 via a transmission unit 30. For its part, the impact mechanism has a piston 21, which acts on a pneumatic spring 23. The transmission unit 30 has the composite gearwheel 10, which is driven about the axis of rotation D. In FIG. 2 B, the torque in the transmission unit 30 (to be more precise at the measurement point 35) is plotted versus the crank angle KW. The crank angle KW is defined about the axis of rotation D. It is readily apparent that the torque M is comparatively low (Mmin) in the range from 0 degrees to 180 degrees and a peak torque (Mmax) arises in the range between 280 degrees and 320 degrees. This is absorbed by the toothed body 5 having an exemplary center angle ZW of 40 degrees.

LIST OF REFERENCE SIGNS

1 Basic body
2 Hub insert
3 Encircling toothing
4 Internal toothing
4' Tooth
5 Toothed body
6, 6' Cutout
7 Slot
8 External tooth
9 Balancing weight
9' Pin hole
10 Composite gearwheel
20 Impact mechanism
21 Piston
23 Pneumatic spring
30 Transmission unit
35 Measurement point
40 Electric motor
100 Hammer drill
D Axis of rotation
K1 First circular arc
K2 Second circular arc
KW Crank angle
M Torque
M1 First material
M2 Second material
R Radial direction
IU Inner circumference
ZW Center angle

What is claimed is:

1. An electropneumatic hammer drill comprising:
   a composite gearwheel for an electropneumatic hammer drill, the composite gearwheel including:
   a basic body consisting of a first material; and
   a toothed body consisting of a second material different from the first material;
   the composite gearwheel having an encircling toothing formed, along a first circular arc, by the toothed body, and formed, along a remaining second circular arc by the basic body;
   wherein the composite gearwheel is installed in a transmission unit of the hammer drill in such a way that only the part of the encircling toothing formed by the toothed body is exposed to an increased torque of an impact mechanism of the hammer drill.

2. The electropneumatic hammer drill as recited in claim 1 wherein the first circular arc has a center angle of less than 90 degrees.

3. The electropneumatic hammer drill as recited in claim 2 wherein the center angle is less than 45 degrees.

4. The electropneumatic hammer drill as recited in claim 3 wherein the center angle is 40 degrees.

5. The electropneumatic hammer drill as recited in claim 1 wherein the basic body has a slot, the toothed body being at least partially introduced into and located in the slot.

6. The electropneumatic hammer drill as recited in claim 1 further comprising a balancing weight compensating for an imbalance caused by the toothed body.

7. The electropneumatic hammer drill as recited in claim 1 wherein the first material is a plastic.

8. The electropneumatic hammer drill as recited in claim 7 wherein the second material is a steel material.

9. The electropneumatic hammer drill as recited in claim 1 wherein the second material is a steel material.

10. The electropneumatic hammer drill as recited in claim 1 wherein exactly one toothed body having a plurality of teeth of the encircling toothing is provided.

11. The electropneumatic hammer drill as recited in claim 1 further comprising a central hub defining a timing of the composite gearwheel.

12. The electropneumatic hammer drill as recited in claim 11 wherein the central hub is form fitting in the basic body.

13. The electropneumatic hammer drill as recited in claim 11 wherein the central hub is in the form of an insert.

14. The electropneumatic hammer drill as recited in claim 11 wherein the central hub has an internal toothing with eight teeth.

15. The electropneumatic hammer drill as recited in claim 1 further comprising a brushless electric motor operatively connected to the impact mechanism via the transmission unit.

16. The electropneumatic hammer drill as recited in claim 1 wherein the impact mechanism has a piston acting on a pneumatic spring.

17. The electropneumatic hammer drill as recited in claim 1 wherein a peak range of a torque angle is from 280 degrees to 320 degrees.

18. A composite gearwheel for an electropneumatic hammer drill, the composite gearwheel comprising:
- a basic body consisting of a first material; and
- a toothed body consisting of a second material different from the first material;
- the composite gearwheel having an encircling toothing formed, along a first circular arc, by the toothed body, and formed, along a remaining second circular arc by the basic body; and
- a balancing weight compensating for an imbalance caused by the toothed body.

* * * * *